(12) United States Patent
Hickey

(10) Patent No.: US 7,210,559 B2
(45) Date of Patent: May 1, 2007

(54) APPARATUS AND METHOD FOR HOLDING/LOCKING A LADDER OR OTHER OBJECT TO A STRUCTURE

(75) Inventor: David R. Hickey, Hinsdale, IL (US)

(73) Assignee: Cross Tread Industries, Inc., Willow Springs, IL (US)

( * ) Notice: Subject to any disclaimer, the term of this patent is extended or adjusted under 35 U.S.C. 154(b) by 312 days.

(21) Appl. No.: 10/833,799

(22) Filed: Apr. 28, 2004

(65) Prior Publication Data

US 2005/0241879 A1 Nov. 3, 2005

(51) Int. Cl.
*E06C 5/00* (2006.01)

(52) U.S. Cl. .................... 182/127; 224/319

(58) Field of Classification Search ........ 182/127; 224/310, 321, 324, 326, 327, 319; 414/462
See application file for complete search history.

(56) References Cited

U.S. PATENT DOCUMENTS

| | | | | |
|---|---|---|---|---|
| 3,888,398 A | * | 6/1975 | Payne | 224/310 |
| 4,390,117 A | * | 6/1983 | Fagan | 224/310 |
| 4,618,083 A | * | 10/1986 | Weger, Jr. | 224/324 |
| 4,813,585 A | * | 3/1989 | Nutt | 224/324 |
| 5,154,258 A | * | 10/1992 | Krukow | 182/127 |
| 5,186,588 A | * | 2/1993 | Sutton et al. | 410/120 |
| 5,297,912 A | * | 3/1994 | Levi | 414/462 |
| 5,918,488 A | * | 7/1999 | Deeter | 224/324 |
| 6,257,534 B1 | * | 7/2001 | Finley | 182/127 |
| 7,111,764 B2 | * | 9/2006 | Smith et al. | 182/127 |

* cited by examiner

*Primary Examiner*—Hugh B. Thompson, II
(74) *Attorney, Agent, or Firm*—Pyle & Piontek

(57) ABSTRACT

A heavy duty apparatus and method are disclosed for holding or locking a ladder or other object in place, say, to a vehicle, such as a van and its rack and/or a rack mounted on a camper top of a pickup truck. The apparatus has a fixed portion and a movable portion which can engage the rings of a ladder and/or a one or more piece of large sheet material in place.

22 Claims, 10 Drawing Sheets

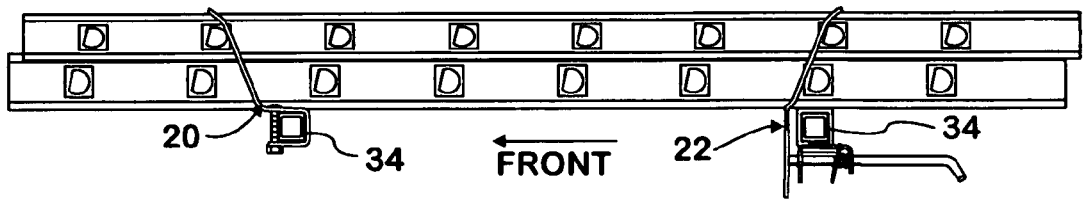
FIG. 3A
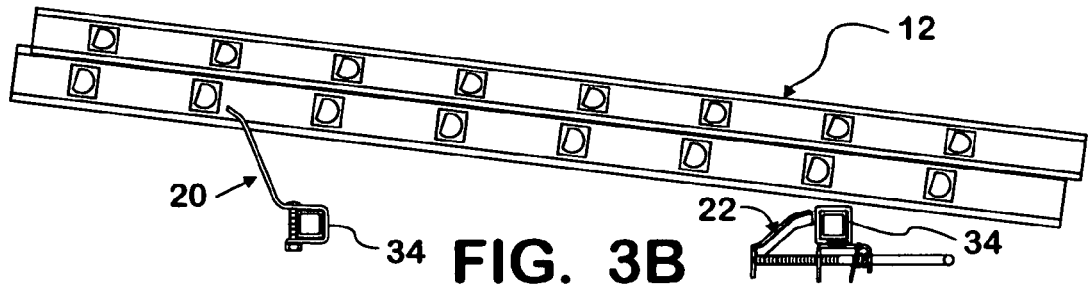
FIG. 3B
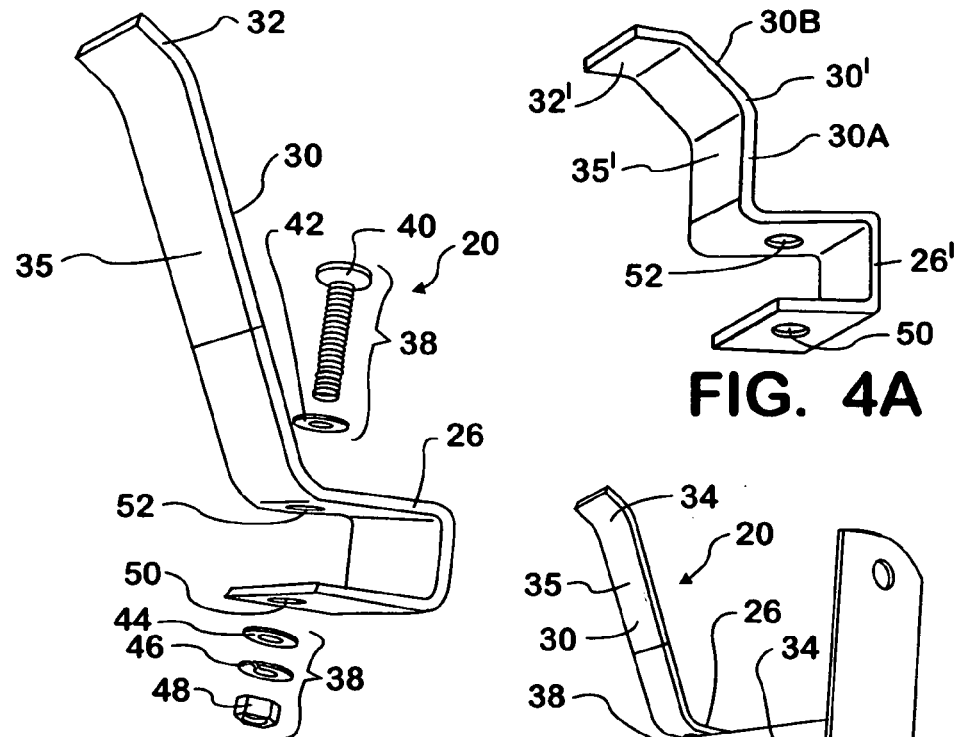
FIG. 4
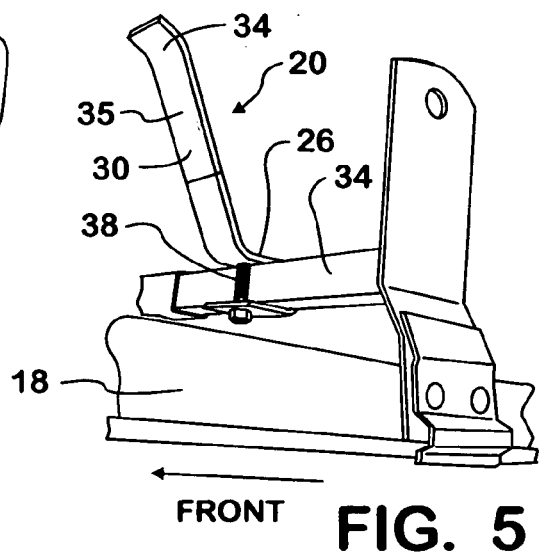
FIG. 4A
FIG. 5

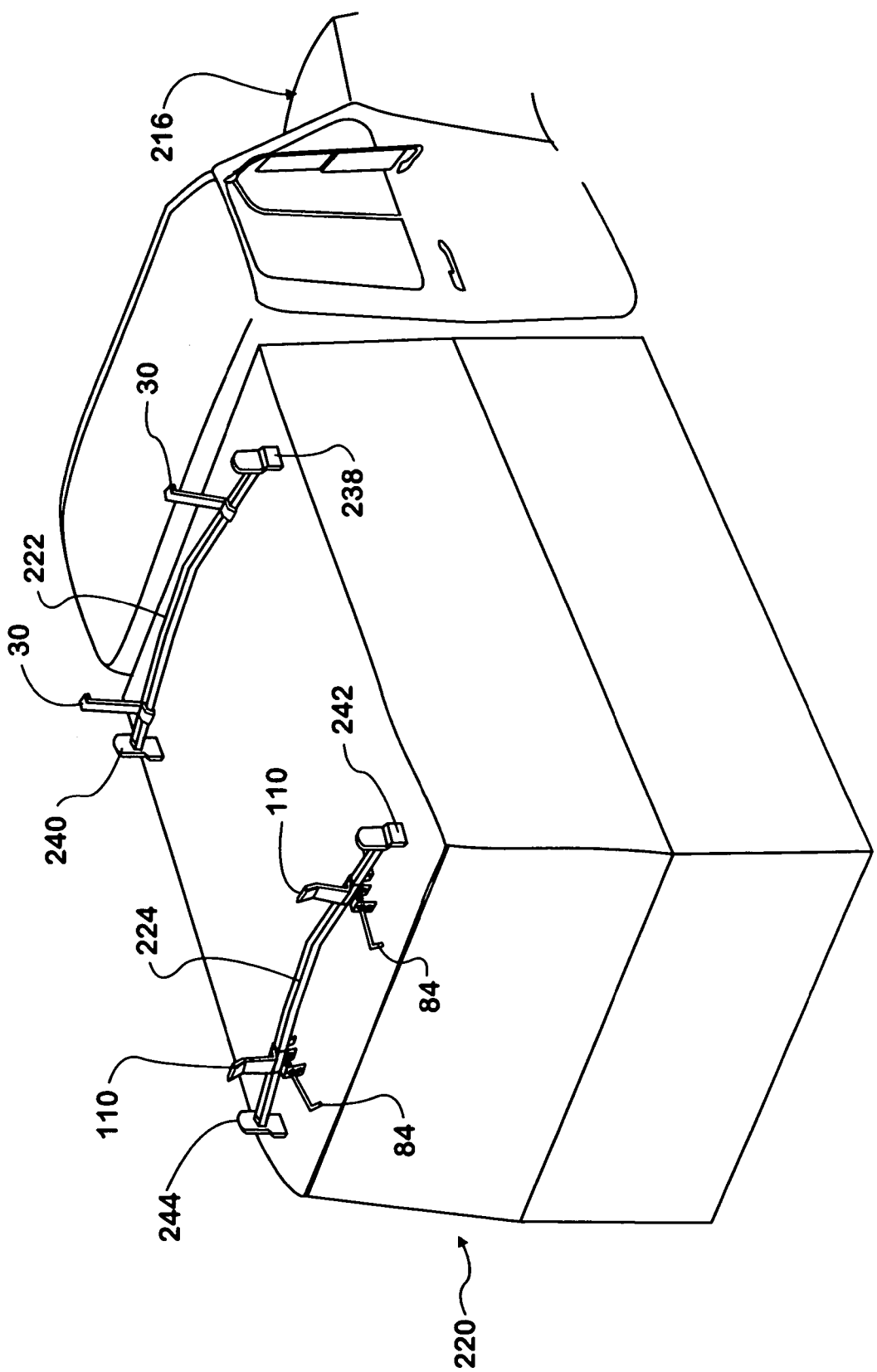

APPARATUS AND METHOD FOR HOLDING/LOCKING A LADDER OR OTHER OBJECT TO A STRUCTURE

BACKGROUND OF THE INVENTION

This invention relates to a device and method for retaining or locking a ladder, or the like, on a structure, and more particularly, for a device and method for holding or locking a ladder to a vehicle rack or cap.

BRIEF DESCRIPTION OF THE PRIOR ART

Heretofore it was known to carry a ladder on a structure or vehicle, such as on a vehicle's rack, like shown in my U.S. Pat. Nos. 5,746,362 and 6,497,350 B1, which are incorporated herein by reference. Due to the nature of a ladder, it is difficult to hold down and lock in place. Various attempts include rope and tying the ladder in place to the rack or vehicle, chaining and padlocking the chain around the ladder and rack or to the vehicle. Various locking devices have been devised, such as shown in the following U.S. Pat. Nos. 4,008,838; 4,390,117; 5,297,912; 5,996,736; 6,290,113 B1; 6,397,644 B1; and 6,523,730 B2 and Publication Nos. U.S. 2001/0007627; 2001/0009637A1; 2001/00302131 A1; and 2003/0034206A1, which are incorporated herein by reference.

Tying and chaining down were slow and still permitted the ladder to slide around to some degree, unless very securely tied or chained, and the latter took more time both to do and undo. Loose or separate devices or locks such as shown in U.S. Pat. Nos. 5,996,736 and 6,397,644 B1, had the disadvantage that they could become misplaced or lost, and time might be needed and inconvenience suffered to find or replace the lock.

What is needed is a simple, inexpensive ladder retainer for holding and/or locking a ladder to a structure, such being for example a building, a vehicle, a vehicle rack or vehicle cap.

SUMMARY OF THE INVENTION

The present invention is an apparatus and method for securely holding, retaining, or if desired, locking a ladder, or the like, to a structure, such as a building, vehicle or a vehicle rack, cap, or the like. While the present invention is described and in most instances will be used to retain a ladder, the invention could be used to retain other objects too, such as lumber, sheets of plywood or wallboard or other building materials. The apparatus of the present invention comprises a first extension or portion for engaging one rung of the ladder and a second extension or portion movable relative to the first portion and being capable of engaging a second rung of the ladder. At least one of the two portions can be mounted on or to the structure, building, vehicle, pickup truck cap, or rack, or the like, so that the ladder rack is always available for use. Preferably, the portions extend toward each other, or away from each other, so as to be able to engage, capture and hold, preferably, two rungs of the ladder. Preferably, the engagement is such so as to minimize any movement or sliding of the ladder where other than ladders are to be retained. The extensions may be used or suitably adapted extensions may be provided, or additional means for retaining such other materials. For example, hook or clamp means for retaining the material may be provided. The two extensions can be mounted to a common member and the common member mounted to the structure (including a building, vehicle, or it cap or rack, etc.). Preferably, instead of the common member, each of the extensions is mounted to the structure (without the use of a common member) and provision is made to move the extensions relative to one another to permit installing and holding and uninstalling and releasing the ladder. Preferably, the movement means for the ladder device can have a smooth and/or notched rod member and a movable element slidable along the rod member so that the associated extension may be placed in positions to hold or release the adjacent ladder rung, the other extension for economy of manufacture being simply fixed in place on the structure. Of course, both extensions could be like the former, rather than the latter, that is, they would have two identical movable extensions. While such construction might be more expensive, it could be operated from either point to install or uninstall the ladder.

Means can be provided to lock the device such as with a built-in locking mechanism or by including tab provisions for a padlock to hold or lock the movable extension in position.

The invention is used in the following method or manner; the two extensions are located and/or attached on the structure. At least one of the extensions though is movable relative the other extension. Thus, the extensions are initially arranged in a position to receive the ladder and its associated two rungs. The movable extension is then moved to its ladder rung engaging/holding portion. The ladder and its two rungs are now held in place between and by the two extensions to the structure. If desired, the provisions on the movable extension can be locked in place, such as by the built-in lock or by a padlock. As noted above, the structure could be a building, a boat, a vehicle, a vehicle or other type, pickup truck cap, or vehicle rack, etc. To remove the ladder, the operations are reversed. That is, if a lock is present and used, it is unlocked or removed. Then the at least one relatively movable extension is moved to its releasing position. Then the ladder or other article is moved away from the other extension and removed. If two movable extensions are provided, either one or both could be moved to the release position and then the article removed.

OBJECTS OF THE INVENTION

It is an object of the present invention to retain an object to a structure. A more specific object of the present invention is to retain a ladder to a vehicle.

Another object of the present invention is to provide a device for retaining a ladder or other object to a rack in a vehicle.

Yet another object of the present invention is to provide a device for retaining a ladder or other object on a pickup truck cap.

A further object of the invention is to hold flat sheets of material, such as plywood, sheetrock, etc.

Still another object of the present invention is to provide an apparatus and/or method for easily and economically accomplishing the above objects, without the use of rope, chain or the like.

These and other objects of the apparatus and method of the present invention will become apparent to a person skilled in the art from the accompanying drawings and written description.

DESCRIPTION OF THE DRAWINGS

FIG. 3A is a further enlarged view showing the device of FIGS. 1 and 2 in a retaining position.

FIG. 3B is similar to FIG. 3A, but showing the device in a releasing position.

FIG. 4 is a further enlarged exploded perspective view of one of the retaining portions of FIGS. 1 and 3.

FIG. 4A shows an alternative to the member shown in FIG. 4, for use with the device shown in FIGS. 9A to 12.

FIG. 5 is a perspective view of the portion shown in FIG. 4, showing it installed on the rack on the vehicle.

FIG. 6A shows a reduced size side elevation comparison of portions of the device for the embodiments shown in FIGS. 1–8 and FIGS. 4A, 6A and 9A–12.

FIG. 15 is a perspective view of FIG. 13, but with the ladder removed.

DESCRIPTION OF THE PREFERRED EMBODIMENTS

Figure 1:
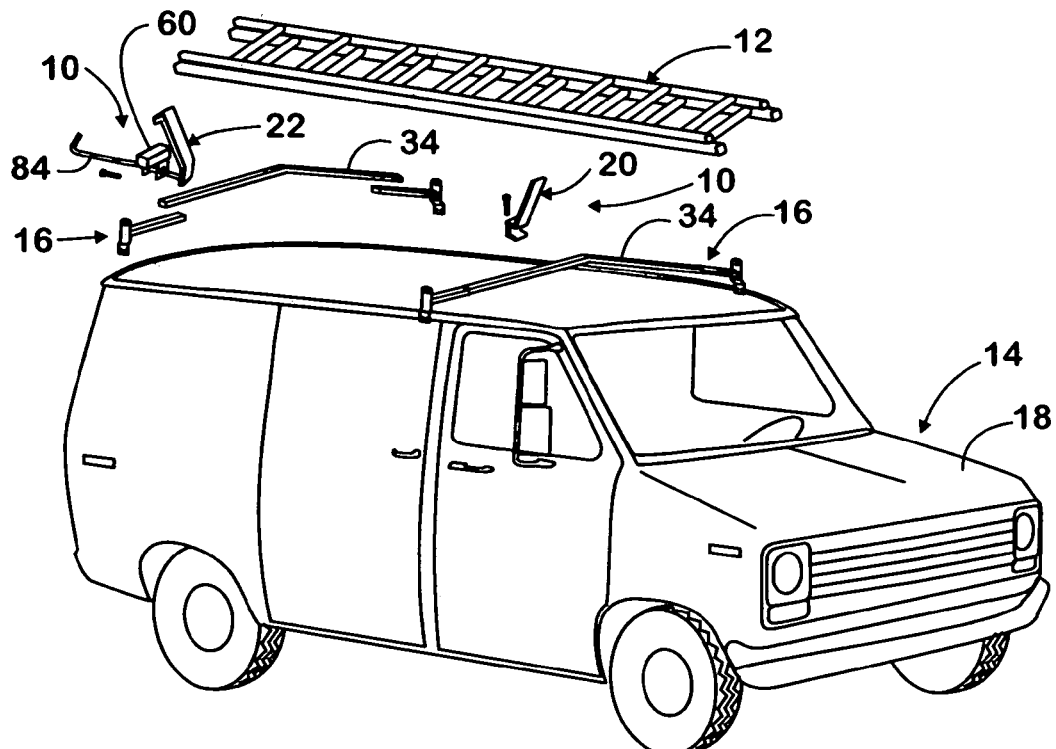
FIG. 1 is an exploded view showing the device of the present invention for retaining an object, in this instance a ladder, to a structure, in this instance a rack, suitable for use on a vehicle.

Referring to FIG. 1, the apparatus 10 and method for holding and/or locking a ladder or other object 12 to a structure 14 in connection with, for example, a rack 16 for mounting on a vehicle 18, for example, a van. The structure can be any suitable structure and need not be limited to a vehicle or van. For example in FIG. 13, the device is shown in conjunction with a pickup truck cap.

The van 18 is typically and frequently used by tradesmen such as carpenters, plasterers, plumbers, etc., as they frequently have the need to carry large items such as ladders, lumber and other large objects, particularly sheet material such as 8×4 foot sheets of plywood, wallboard, etc.

The rack 16 could be of any type and/or like that shown in my U.S. Pat. Nos. 5,746,362 and/or 6,497,350 B1. The rack 16 can be secured to the van 18.

The invention includes apparatus 10, which may have at least two portions 20 and 22, one being mounted toward the front portion of the rack, vehicle or structure, and the other being mounted at the rear portion of the rack, vehicle or structure.

Referring to FIGS. 4 and 5, one of the portions (in this instance the front portion 20) is bent from a strip of material, for example, aluminum or steel, to have a U-shaped structure engaging portion 26 and an extending (in this case upwardly) object engaging or lock down portion 30. The upper tip 31 is slightly curved or bent and the upper portion is covered with a protective material 35, such as plastic. Likewise the other portions 30, 30', 110, 110' can be plastic coated, as can be the lock handle 88. The upper end 36 extends generally upwardly at an angle of about 50 to 70° with an angle of about 55 to 65° being preferred. The upper end is about 7 to 9 inches long, with about 7¾ to 8¼ inches being preferred.

As will be discussed later, this piece could have a shape to accommodate the carrying and holding of large pieces other than a ladder, such as lumber or a stack of sheets of material, as is shown in FIG. 4A. As this part is generally similar to part 20, it will be given prime numbers. That is, 26 would be 26' and only the differences will be described. To assist in holding other objects, such as sheets, the upper portion or object engaging portion has a lower portion 30A which generally is 90° or vertical and then bends to form the ladder engaging portion 30B. The portion 30A could be about 1¼ to 2¼ inches in height with 1¾ to 2 inches being preferred.

While other means could be provided, in this instance to mount the portion 20 to the rack crossbar 34, fastening means 38 is provided. The fastening means here comprises a bolt 40, washer 42, second washer 44, lock washer 46 and nut 48, and cooperating opening 50 and 52. This portion is shown mounted on the rack crossbar 34 in FIG. 5, the U-shaped portion 26 surrounding the crossbar 34 and then the bolt 40, washers 42, 44 and 46, and nut 48 being installed and tightened to hold the portion 20 at a desired location on the crossbar 34.

Figure 6:
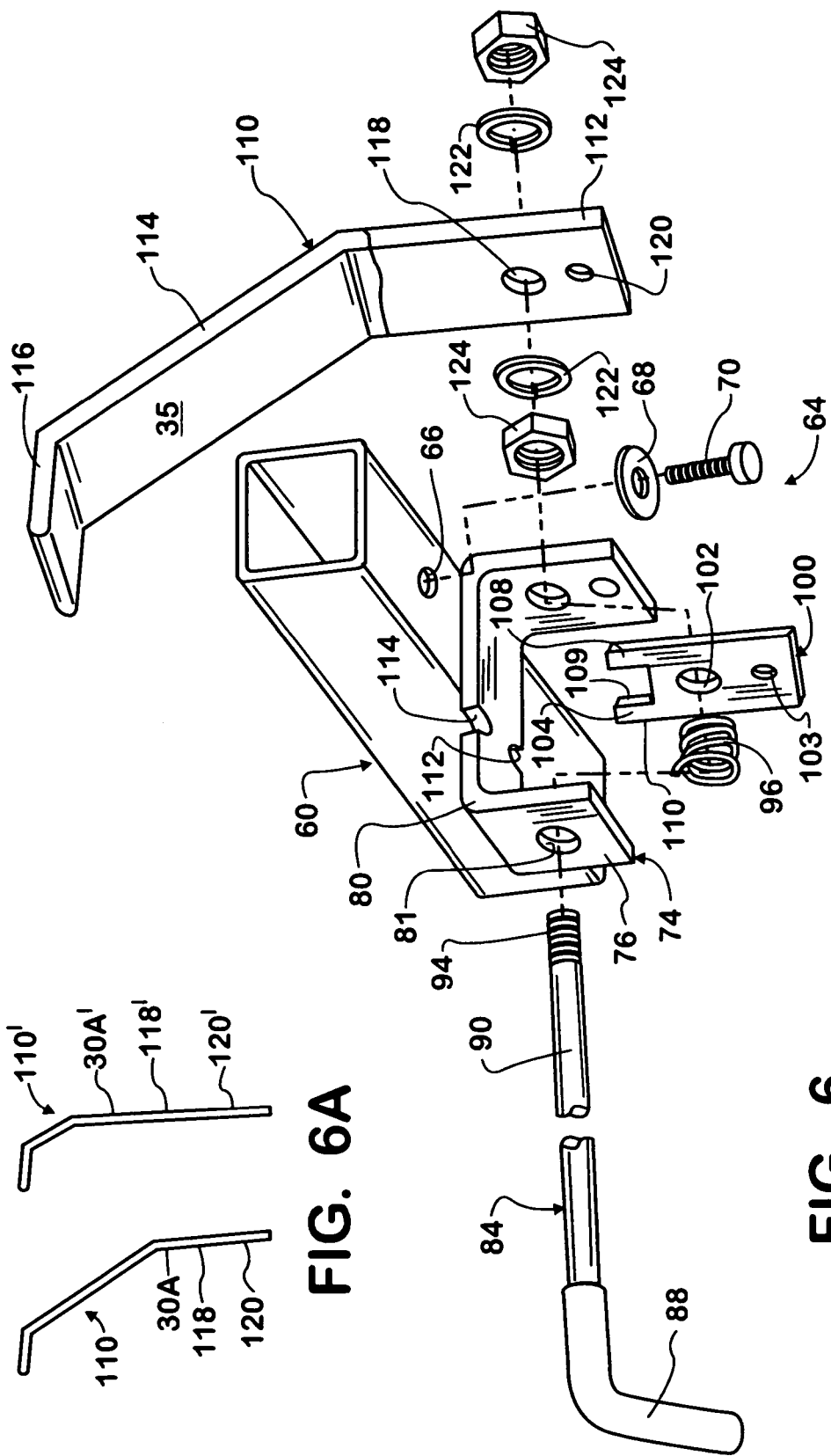
FIG. 6 is an exploded perspective view showing how the other portion or relatively movable portion shown in FIGS. 1 and 2 is assembled.
Figure 7:
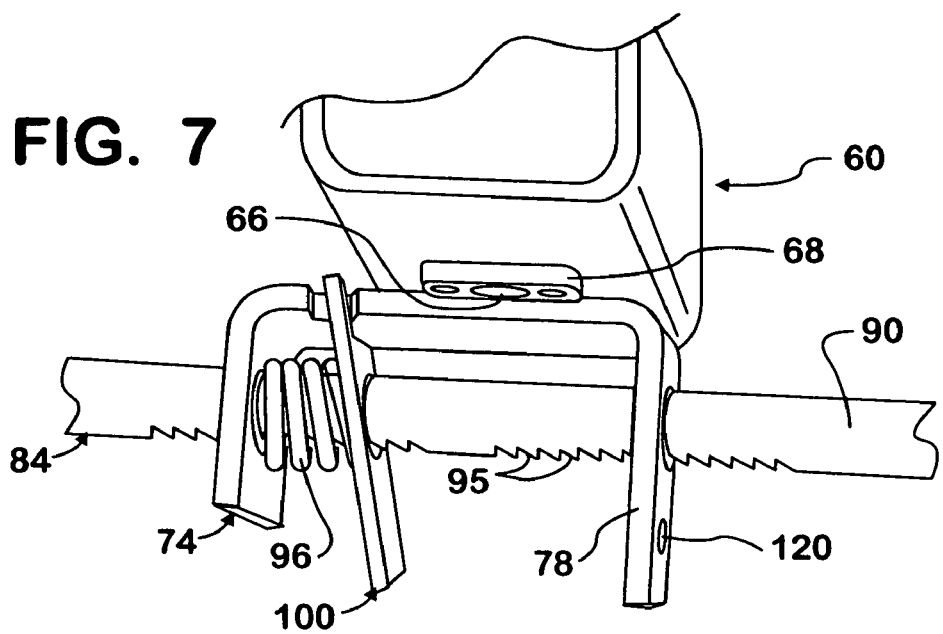
FIG. 7 is an enlarged partial perspective view of the other or relatively movable portion shown in FIGS. 1 and 2, showing its position holding mechanism.
Figure 8:
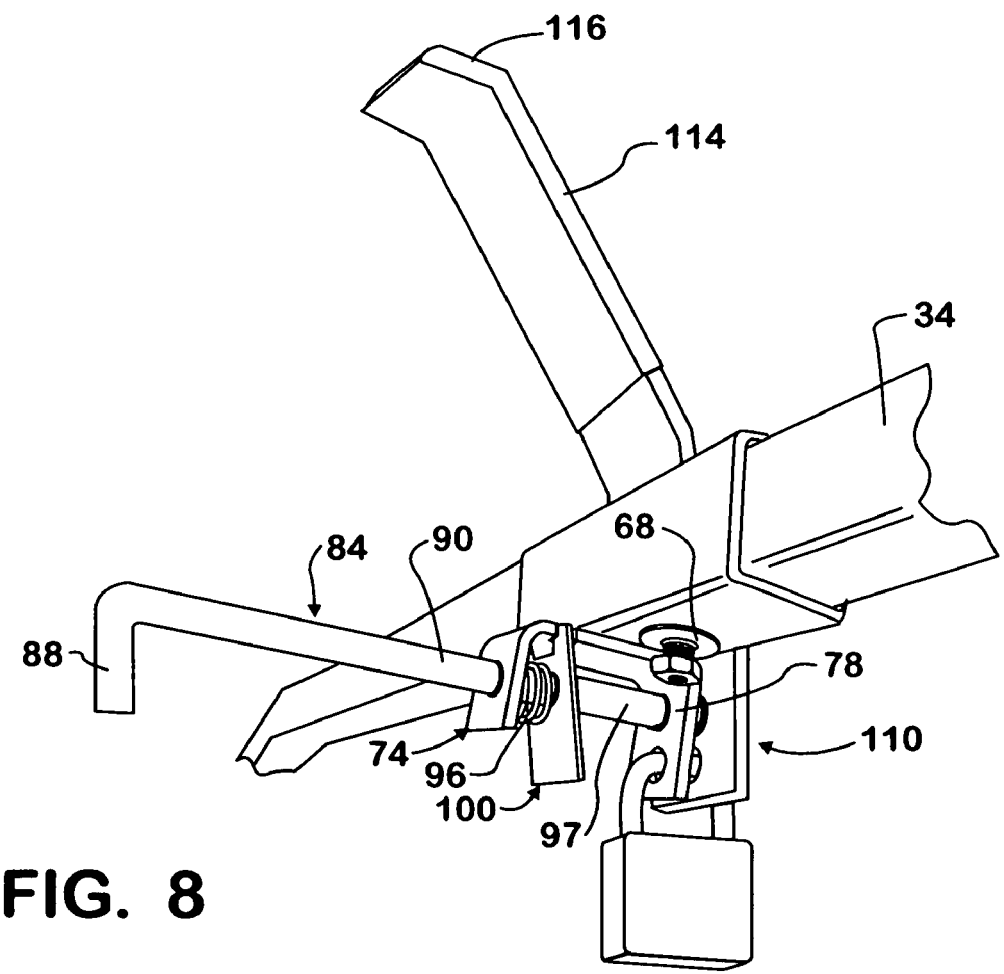
FIG. 8 is a perspective view of the other portion shown mounted on the rack crossbar and in a locked position, being locked with a padlock.

Referring to FIGS. 6, 7 and 8, the rear portion 22 is shown. As is shown in FIG. 8, this portion 22 has a tube 60 somewhat larger than the rack crossbar section so as to be telescopically received on the crossbar. This tube portion is of a similar but slightly larger shape than the crossbar, in this instance rectangular or square. If the crossbar has an outside dimension of 1½ by 1½ inches, the tube would have slightly larger inside dimensions, for example, 1⅝ by 1⅝ inches. The tube 60 could, for example, have a length of about 4–7 inches with about 5 inches, plus or minus 12 inch, being preferred. Means 64 are provided for, to positively locate the tube 60 on crossbar 34 in the desired position. In this instance, means 64 are an opening 66 in the tube 60, which receives a spot welded nut 68. The nut 68 receives a bolt 70, which, when screwed into the nut, engages the crossbar outer surface to lock or hold the tube in place.

Secured to the tube 60 is a generally U-shaped slide-through clip 74. This clip 74 has a front vertical portion 76 and a rear vertical portion 78, joined by an integral horizontal portion 80. The horizontal portion 80 can be fastened by any means to the tube 60, such as by welding, riveting, screwing, bolting, etc. As shown, the vertical portions 76 and 78 have large openings 81 and 82, which could slidably receive a handle rod 84.

The handle rod has a handle portion 88 at one end, which may also be coated with a plastic, and the other end is, in this instance, a cylindrical rod 90. The rod 90 is about 12 to 18 inches long and has a threaded end 94 at its end opposite the handle 88. The rod's cooperating locking portion is preferably smooth 97 (as shown in FIG. 8) instead of notched 95 (as shown in FIG. 7) since the smooth portion avoids the expense of forming the notches and holds quite well without the notches 95.

As better shown in FIGS. 7 and 8, the rod 90 is slid into opening 82 and then into a compression spring 96.

Next, a hold-release clip 100 having an opening 102 is slid onto the rod 90. The clip 100 is a generally flat member with the opening 102 at about the center thereof and pivoting tabs 104 and 108 formed by a notch 109 at the end 110. These notches engage into complimentary cuts or notches 112 and 114 formed on the horizontal portion 80 of the slide clip 74. The spring 96 biases the hold-release clip 100 toward the off-vertical portion. The clip 100 has a cooperative lock means in the form of an opening 103. The rod 90 can be released by moving the release clip 100 so as to compress the spring 96 so that the opening 102 is vertical and aligned to free the rod 90 to slide. As shown, the rod 90 is preferably smooth, but could be notched or grooved.

The rod 90 carries the other lock down bar 110. This bar has a generally vertical portion 112, an angular portion 114, topped off with a shorter curved or bent top portion 116. Generally, this lock down bar is bent from a strip of material, such as steel or aluminum. The portion 112 has an opening 118 to receive the rod 90, and a locking opening 120 therebelow. As is shown, the lock down bar 110 is secured to the rod 90 at its threaded end 94, by the two washers/lock washers 122 and the two nuts 124. Of course, other securing means could be used, such as by a shoulder on the rod and a single washer and nut, or by welding.

Again, alternatively, the lock down bar could have a shape similar to that as shown in FIG. 4A. That is, the position that extends above the crossbar of the rack could first be vertical to better engage a stack of or sheet material or other objects, and only then be bent to form the ladder rung engaging top portion. A comparison is shown in FIG. 6A, again with primes being used. The member 110' has a more vertical center portion 30A' to accommodate the height of the stack, which functions like 30A.

Figure 2:
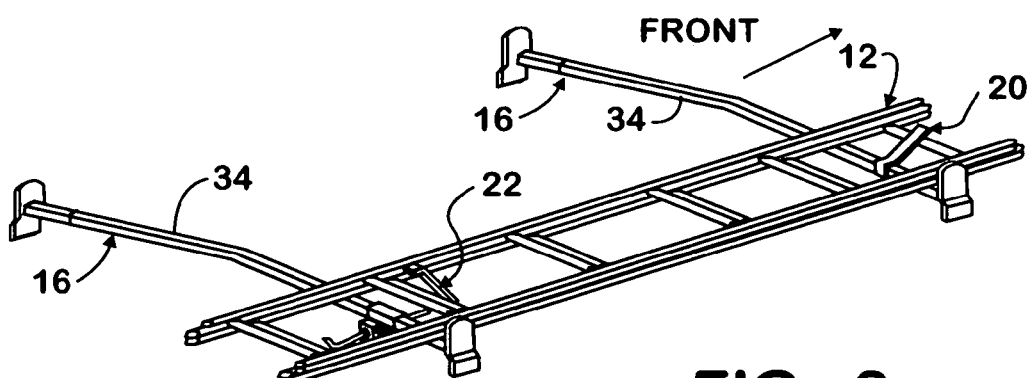
FIG. 2 is an enlarged view of the device of the present invention shown mounted to the rack and retaining an object, in this instance, a ladder.

As is shown in FIG. 2, with the two lock down portions or bars 30 and 110 or 30' and 110' mounted to the two crossbars 34 of the rack 16, a ladder or other object 12 can be placed on the fixed lock down bars so that the ladder rung 12A is engaged by the bar 30 or 30'. Then the rod/handle 110 or 110' is pulled closer so that the portion of the other or relatively movable lock down bar engages rung 12B to hold the ladder 12 in place. If desired, the ladder 12 and rack 16 can be locked, that is, when the ladder 12 is installed on the rack 16, and engaged by the two lock down portions 30 or 30' and 110 or 110' and the hold-release clip 110 can be held or locked in place to the slide-through clip 74, the hasp 120 of a lock 122 passing through openings 103 and 120 to lock the object or ladder in place.

Figure 11:
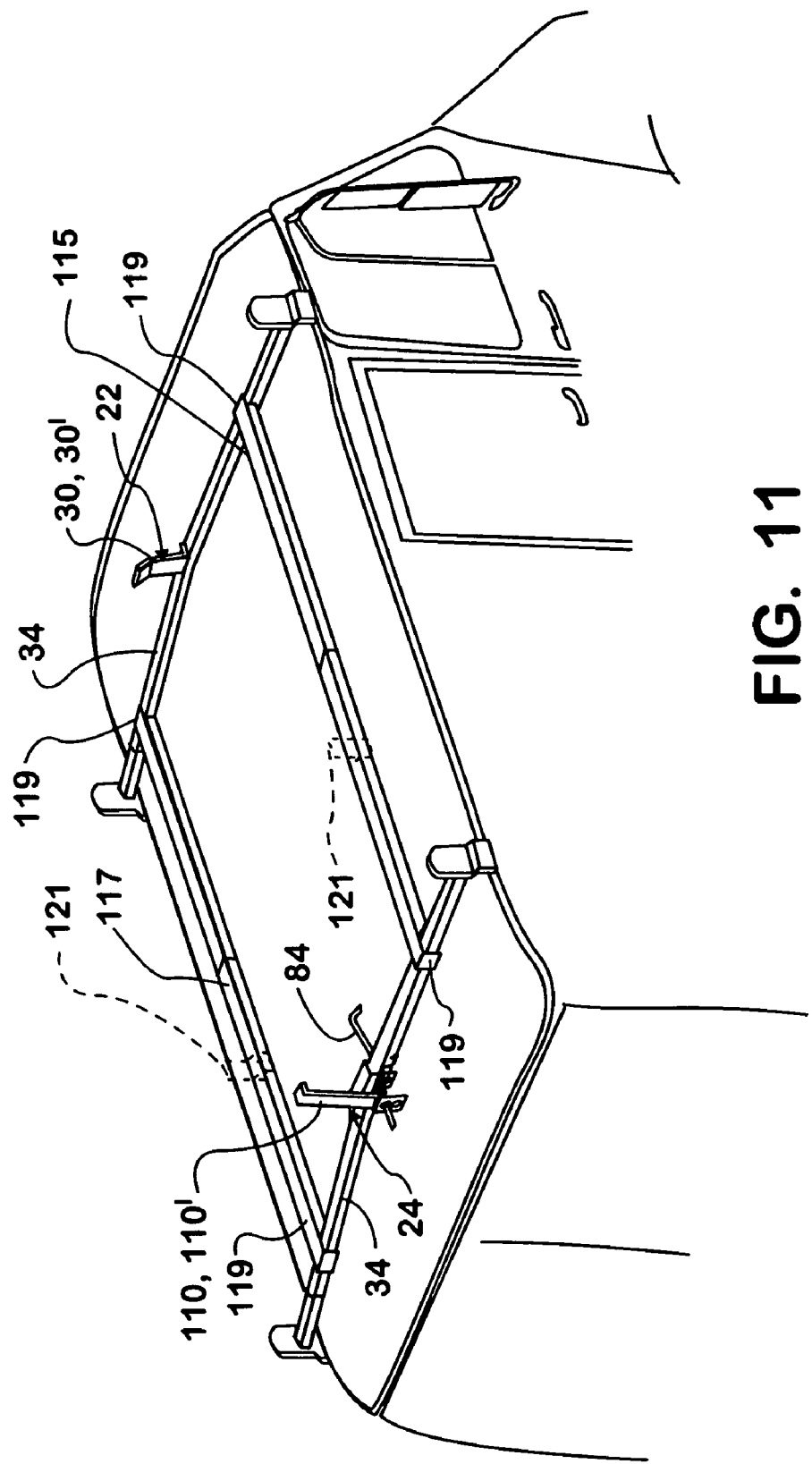
FIG. 11 is a top view of the side crossbar shown in FIG. 11 attached to the front and rear crossbars of a rack and some optional side tabs shown in dotted lines.

While a ladder is secured with the device of the present invention, other objects could also be secured. For example, if the lock down bars are switched or reversed so that they extend toward each other, rather than away from each other, they could be used to hold a ladder and/or other objects such as lumber, pipes or sheet material, such as one or more or a stack of masonite, plywood, sheetrock, wall or other board sheets. The reversal is necessary to place the rack crossbars 34 on the "inside" to be in position to support the other materials which may not be as rigid as a ladder, such as large sheets of wallboard, plywood, lumber, etc. If further support were needed, a third crossbar for the rack could be provided at the center of the vehicle or additional side crossbars 119 and 117 (FIG. 11) be run between the front and rear crossbars 34. It would be of great convenience to a tradesperson not to have to load such large objects onto a van, but to easily secure the objects onto the top of a van rack.

If desired, two or more sets of lock down bars could be fitted, with at least one being at each end. That is, for example, you could have two spaced apart, fixed lock down bars to one crossbar 34 of the rack, and a relatively movable lock down bar 110' and 30' on the other cross down bar of the rack. The three lock down bars 30, 30' and 110' would be useful with large sheets, such as 4×8 foot sheets of plywood, etc. Of course, two fixed lock down bars 30 and 30' could be used with two relatively movable lock down bars 110 and 110', say one at each corner to hold down several sheets of plywood, etc. at four points.

To this end, the fixed end bars could be alike as shown in FIG. 4A, while the relatively movable ones are like that shown in FIG. 6A. Of course, the relatively movable bars would be attached to a mechanism similar to those shown in FIG. 6.

Figure 9A:
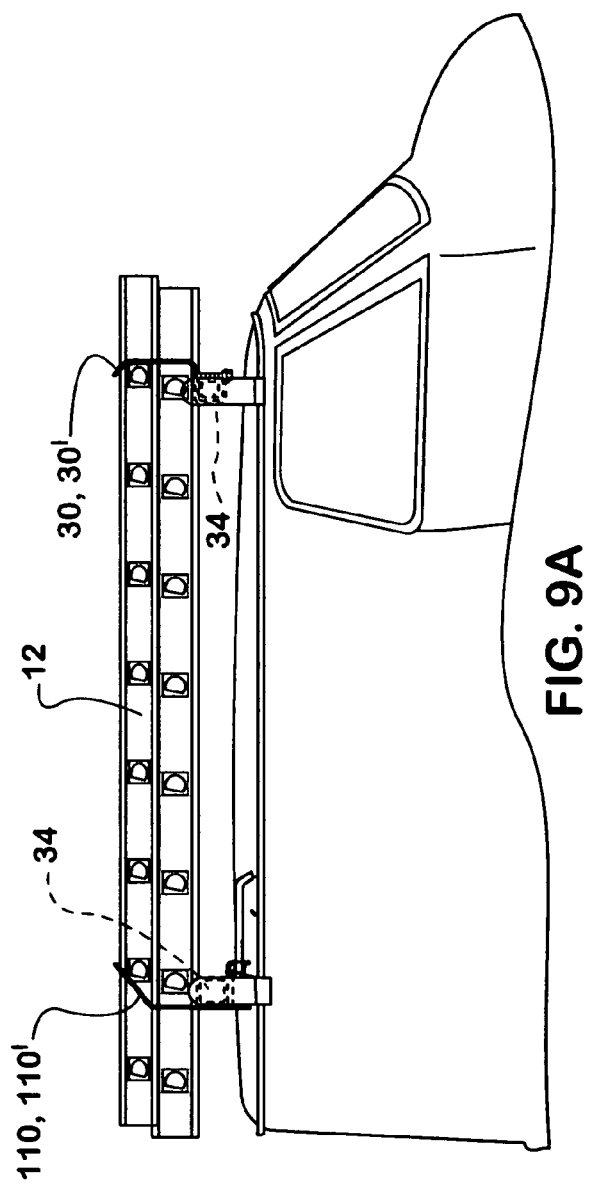
FIG. 9A is an elevational view of another embodiment of the invention mounted on a van rack in a manner to hold a ladder.
Figure 9B:
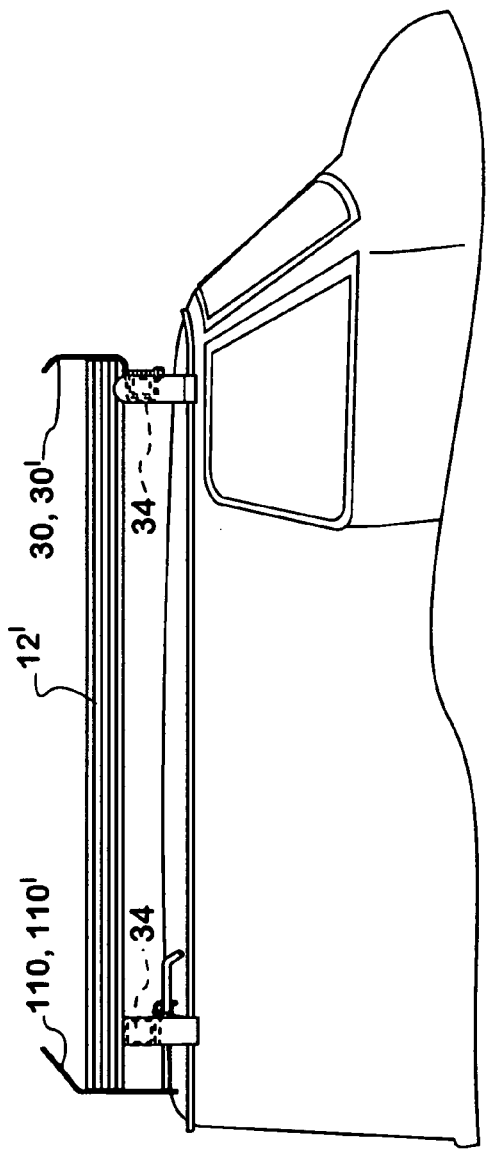
FIG. 9B is a view similar to FIG. 9A, but showing that embodiment retaining a stack of other material, such as wallboard or plywood sheets.
Figure 10:
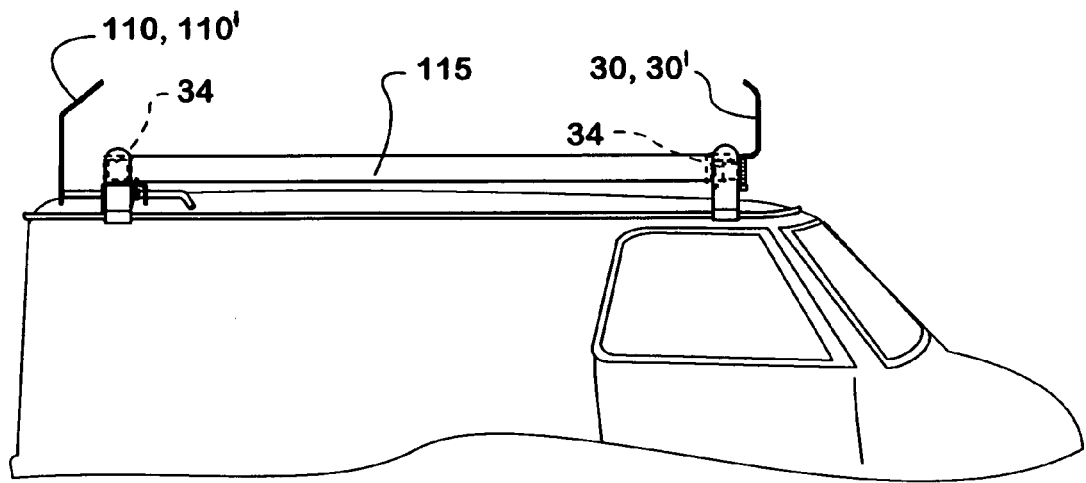
FIG. 10 is a side elevational view of side crossbars which could be used with the configuration shown in FIG. 9B.
Figure 12:
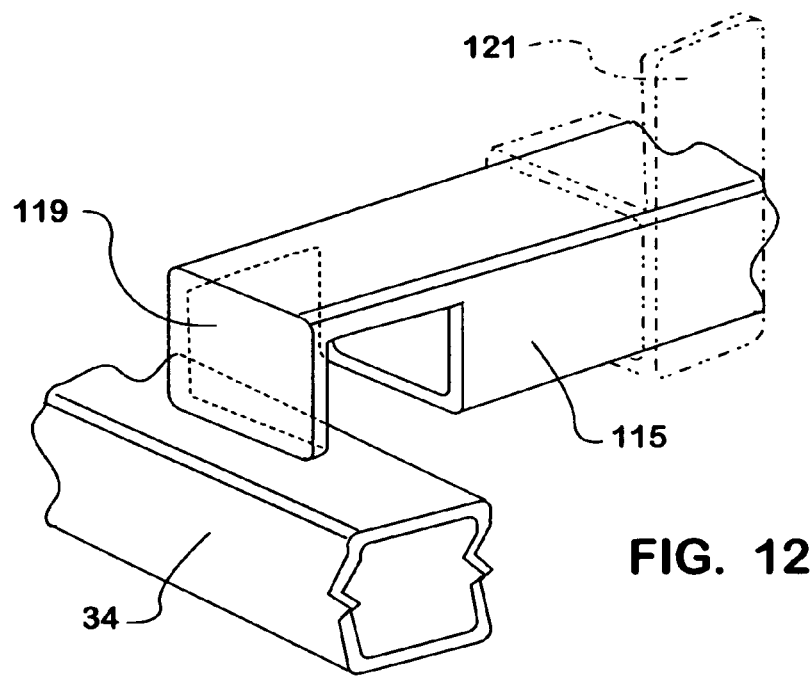
FIG. 12 is an enlarged perspective view of one end of a side bar showing how it could be mounted on a crossbar of a van rack and some optional side tabs shown in dotted lines.

As shown in FIG. 9A, such structure or assembly could hold a ladder 12 as shown in FIG. 9B or a plurality or stack of large sheet material 12'. The vertical portion of lock down bars 30' and 110' engaging the ends of the sheets 12', while the crossbars, be it two, three or more, or additional side crossbars 115 and 117, carrying the considerable weight of the stack of sheet material. As noted, these side crossbars could be similar shaped in cross-section, of a telescopic construction to fit between crossbars 34 set at various distances on the bar and have hooked ends 119 that clip over the crossbars 34 to hold them in place. These side bars could be secured by various type fasteners, and/or held by the weight of the material being carried. Such construction is shown in FIG. 12. Additionally, means could be provided, if desired, to further retain the ends of the stack in place, such as by bent or other tabs 121 extending up from or on the side cross bars.

In use, for example, the sheets would be placed on the rack and abutted against fixed stops or lock down bars 30 or 30', and if used tabs 121, and then the movable lock down bars 110 or 110' forced against the other end of the stack to hold them in place. Unloading would be just a reverse procedure.

Figure 13:
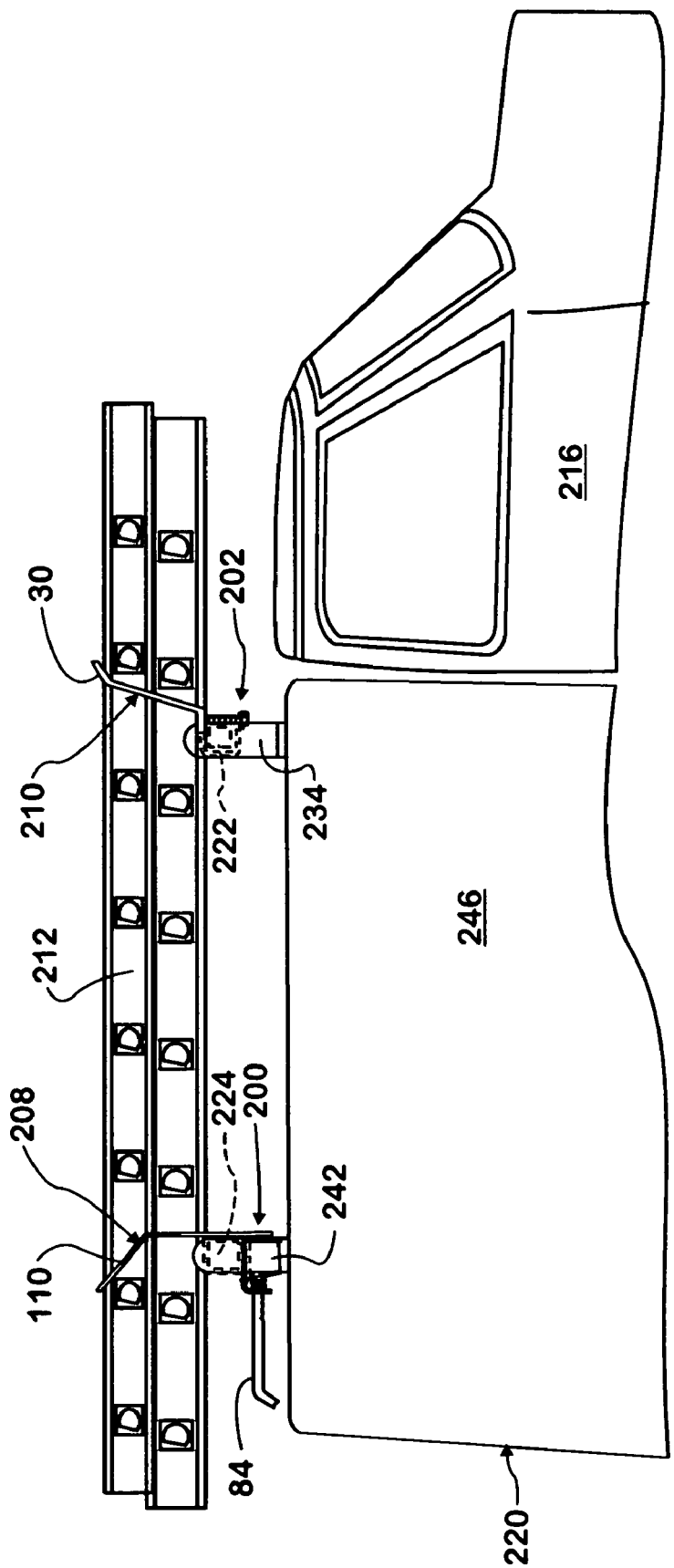
FIG. 13 is a side elevational view of the device of the present invention shown incorporated into a rack installed on a pickup truck cap.
Figure 14:
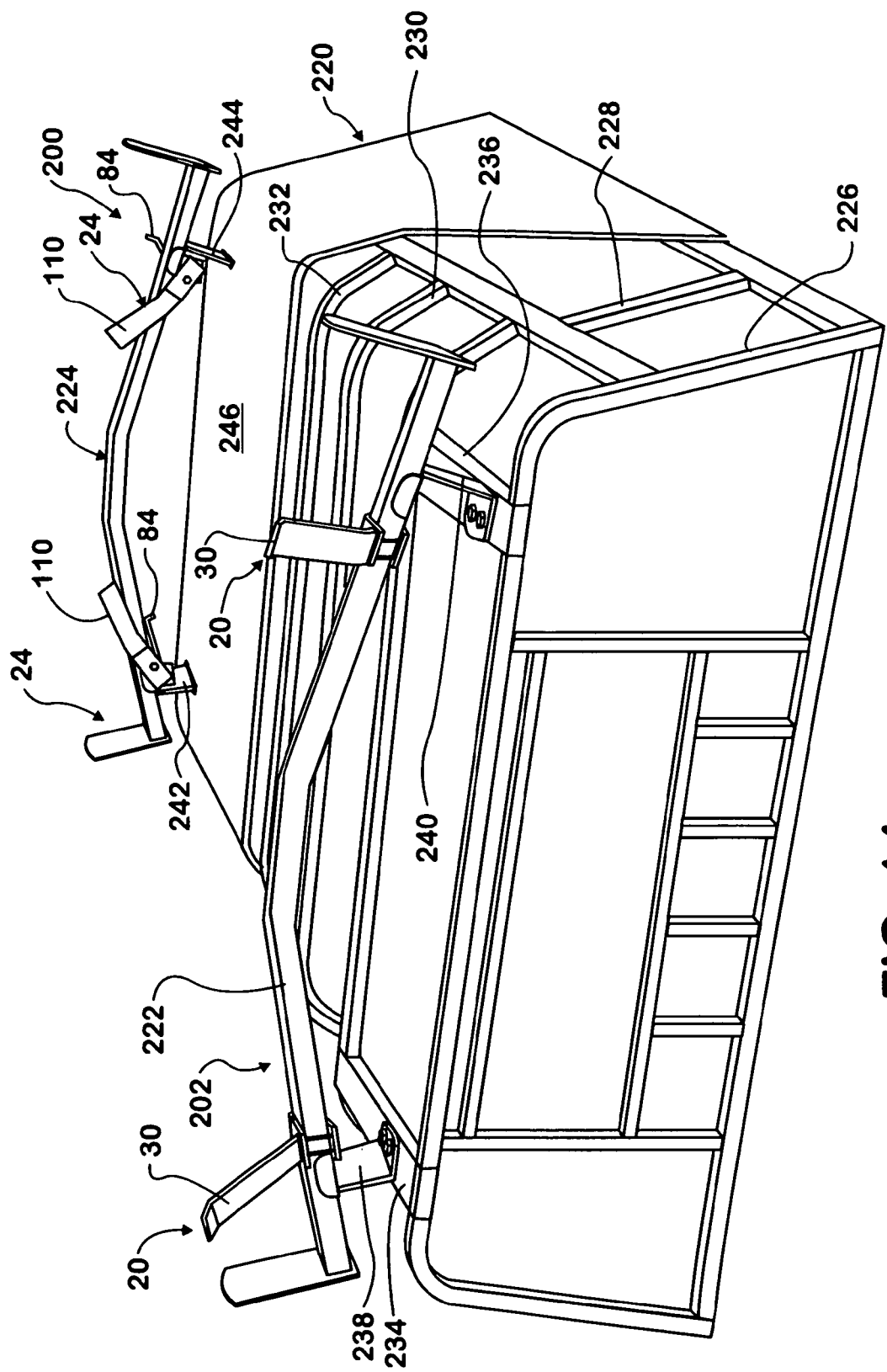
FIG. 14 is an enlarged perspective view of the cap of FIG. 12, with portions broken away to show how the cap may be built or reinforced to accommodate the rack and the lock means of the present invention.

Referring to FIGS. 13 to 15, the present invention includes a rack with cross bars 200 and 202 and locking arrangement 208 and 210 to hold a ladder 212 or other article to a pick up truck 216 camper top 220 is illustrated. As is shown, the rack would have at least a front rail 222 and a rear rail 224, like those shown earlier, that extend across the top of the camper 220. As is better shown in FIG. 14, the camper top generally has frame members 226, 228, 230, 232, etc. made of steel or aluminum which are bent to shape. If need be, pairs reinforcing channels or sections 234 and 236 can be mounted between these frames to carry the mountings 238, 240 for the front rail 222. It is understood that similar construction can be provided at the rear of the camper to carry the rear rail and its mounts 242 and 244.

As is shown, the camper frames can be covered with say aluminum or fiberglass outer shell 246. Generally, the reinforcements if needed, would be provided, then the shell applied 246, and then the rack 200 or 202 mounted on top of the shell.

The rack 200 can be fitted with one or two sets of locks like those heretofore described. Generally, for access, it would be desirable to place the non-movable clip(s) 250 forward, with the movable lock portion(s) 252 with its locking handle 254 at the rear of the truck. Thus, the driver can step up onto the truck bumper and easily operate the lock handle(s).

While a rack and lock arrangement like that of FIGS. 1 to 8 is shown in FIGS. 13 to 15, it should be understood that a rack and lock arrangement like that shown in FIGS. 9A to 12 could also be adapted and mounted to a pick up truck camper. Thus, the pick up truck camper could also accommodate carrying other objects, such as flat sheet material.

While the preferred embodiments and step of the apparatus and method of the present invention have been described, equivalent elements and steps to those described should be considered to fall within the scope of the following claims.

What is claimed is:

1. A ladder lock for securing two horizontally spaced apart rungs of a ladder laying horizontally on a ladder rack mounted on a vehicle, said ladder rack having one cross member mounted adjacent the front of the vehicle and a second cross member mounted adjacent the rear of the vehicle, the ladder lock comprising a first portion secured to one cross member of the ladder rack and a second portion secured to the second cross member of the ladder rack, said first portion having a first extension extending one of away from or toward the second portion for engaging one of said two horizontally spaced apart rungs of the ladder, said second portion having a second extension extending one of away from or toward the first portion for engaging the other of said two horizontally spaced apart rungs of the ladder, at least one of said first and second extensions being slidably relatively movable to the others of said first and second extensions for causing said first and second extensions to grip the two horizontally spaced apart rungs of the ladder to hold said ladder to said ladder rack on said vehicle, said at least one of said first and second extensions being relatively movable being securable in position to hold said first and second extensions in position to grip said two horizontally spaced apart rungs of the ladder to hold said ladder onto said ladder rack on said vehicle.

2. A ladder lock as in claim 1, wherein said relatively slidable movable extension may be locked in position.

3. A ladder as in claim 1, wherein said ladder lock is locked in position on a ladder by a padlock.

4. A ladder lock as in claim 3, further comprising means adjustably holding the first and second extensions in a relatively slidable position, including a rod member and a second member slidable along said rod member, the movement of said rod member retaining said ladder holding said first and second extensions in relatively slidable position to retain said ladder in place, wherein said slidable member has an opening therein to receive a padlock.

5. A ladder lock as in claim 1, further comprising means for adjustable holding the first and second extensions in relative slidable position to one another.

6. A ladder lock as in claim 5, wherein said means for adjustably holding includes a rod member and a second member slidable along said rod member, movement of said slidable member on said rod member retaining said ladder in place.

7. A ladder lock as in claim 6, wherein said slidable member has provisions to be locked in place with a padlock.

8. A ladder lock as in claim 6, wherein said vehicle is a van and said ladder lock and rack are secured to said van.

9. A ladder lock as in claim 1, wherein said vehicle is a pickup truck and ladder lock and rack are secured to said pickup truck.

10. A ladder lock as in claim 9, further comprising a camper top for said pickup truck, said ladder lock and rack being secured to said camper top, said camper top being mounted to said pickup truck.

11. A ladder lock as in claim 9, wherein said camper top has frames, one or more reinforcement channels being provided between two or more frames, and said rack is secured to said one or more reinforcement channels, 12. A ladder lock as in claim 1, wherein said cross members are adjacent each other and adapted to support sheet material.

13. A ladder lock as in claim 12, comprising at least a support for said sheet material in addition to said cross members.

14. A ladder lock as in claim 12, wherein said support for said sheet material comprises a third cross member on said vehicle.

15. A ladder lock as in claim 12, wherein said support for said sheet material comprises a side cross bar extending between the two or more cross members, said side cross bar being generally perpendicular to and substantially in the same plane as said two or more cross members.

16. A ladder lock as in claim 15, wherein each end of said side cross bar may be secured to said two or more cross members.

17. A ladder lock as in claim 12, wherein said sheet material has corners, and wherein two or more first extensions are provided and two or more second extensions are provided, said two or more first extensions and two or more second extensions being located adjacent the corners of said sheet material to hold the same.

18. A ladder lock as in claim 12, wherein said first and second extension has vertical portions to abut a stack of sheet material.

19. A ladder lock as in any of claims 1, 2, 3, 5, 6, 8, 9, 10, 11, wherein said first extension extending horizontally one of away from or toward the second portion, and said second portion having a second extension horizontally extending one of away from or toward the first portion, and at least one of said first and second extensions being horizontally slidably relatively movable to the other of said first and second extensions.

20. A method for locking a ladder having at least two horizontally spaced apart rungs to a structure, using a ladder lock having two spaced apart extensions for engaging the at least two horizontally spaced apart rungs of the ladder, comprising, mounting the two extensions to the structure with one extension being relatively slidably movable to the other, engaging at least one rung of the horizontally spaced apart two rungs of the ladder with one of the extensions, slidably moving the other extension to engage the other rung of the horizontally spaced apart two rungs of the ladder, relatively holding the first extension relative to the second extension, whereby the ladder is sucured by the extension to the structure.

21. A method as in claim 20, wherein said step of holding comprises locking said slidable, movable extensions in its position.

22. A method for locking a ladder as in any of claims 20 and 21, comprising the further steps, mounting the two extensions to the structure with one extension being relatively horizontally slidably movable to the other, and horizontally slidably moving said one extension to engage the other rung of the horizontally spaced apart two rungs of the ladder.

* * * * *

UNITED STATES PATENT AND TRADEMARK OFFICE
CERTIFICATE OF CORRECTION

PATENT NO. : 7,210,559 B2
APPLICATION NO. : 10/833799
DATED : May 1, 2007
INVENTOR(S) : David R. Hickey It is certified that error appears in the above-identified patent and that said Letters Patent is hereby corrected as shown below:

Column 8, line 66, "sucured" should be --secured--

"extension" should be --extensions--

Signed and Sealed this

Third Day of July, 2007

JON W. DUDAS
*Director of the United States Patent and Trademark Office*